United States Patent [19]
Kim

[11] Patent Number: 5,623,310
[45] Date of Patent: Apr. 22, 1997

[54] APPARATUS FOR ENCODING A VIDEO SIGNAL EMPLOYING A HIERARCHICAL IMAGE SEGMENTATION TECHNIQUE

[75] Inventor: Jin-Hun Kim, Seoul, Rep. of Korea

[73] Assignee: Daewoo Electronics Co., Ltd., Seoul, Rep. of Korea

[21] Appl. No.: 623,763

[22] Filed: Mar. 29, 1996

[30] Foreign Application Priority Data

Mar. 31, 1995 [KR] Rep. of Korea ................. 95-7314

[51] Int. Cl.⁶ .................................................. H04N 7/32
[52] U.S. Cl. ........................................ 348/394; 348/396
[58] Field of Search ................................ 348/384, 390, 348/391, 393, 394, 396; 382/164, 166, 236, 238, 242, 243

[56] References Cited

U.S. PATENT DOCUMENTS

| 5,204,920 | 4/1993 | Moran et al. | 382/166 |
| 5,465,118 | 11/1995 | Hancock et al. | 348/396 |
| 5,506,621 | 4/1996 | Ogasawara et al. | 348/396 |

*Primary Examiner*—Amelia Au
*Attorney, Agent, or Firm*—Pennie & Edmonds

[57] ABSTRACT

An apparatus for encoding a video signal comprises a processor for extracting chrominance levels for pixels in a current image frame of the video signal to generate a current chrominance image and for segmenting the generated image into a plurality of current chrominance regions to provide contour and texture information of each segmented current chrominance region; a block for deriving errors between a mean chrominance level of each segmented current chrominance region and that of each of its previous segmented chrominance regions and selecting one of the segmented previous chrominance regions which yields a minimum error to produce motion information denoting the selected segmented previous chrominance region and information representing a mean level difference between the segmented current and the selected segmented previous chrominance regions; a processor for extracting a segmented luminance region having luminance levels which corresponds to each segmented current chrominance region from the current image frame and for sub-segmenting the extracted region into a multiplicity of regions to produce contour and texture information for each sub-segmented luminance region; and a block for coding the contour information, the motion information and the difference information for each segmented current chrominance region, and the contour and texture information for each sub-segmented luminance region.

2 Claims, 1 Drawing Sheet

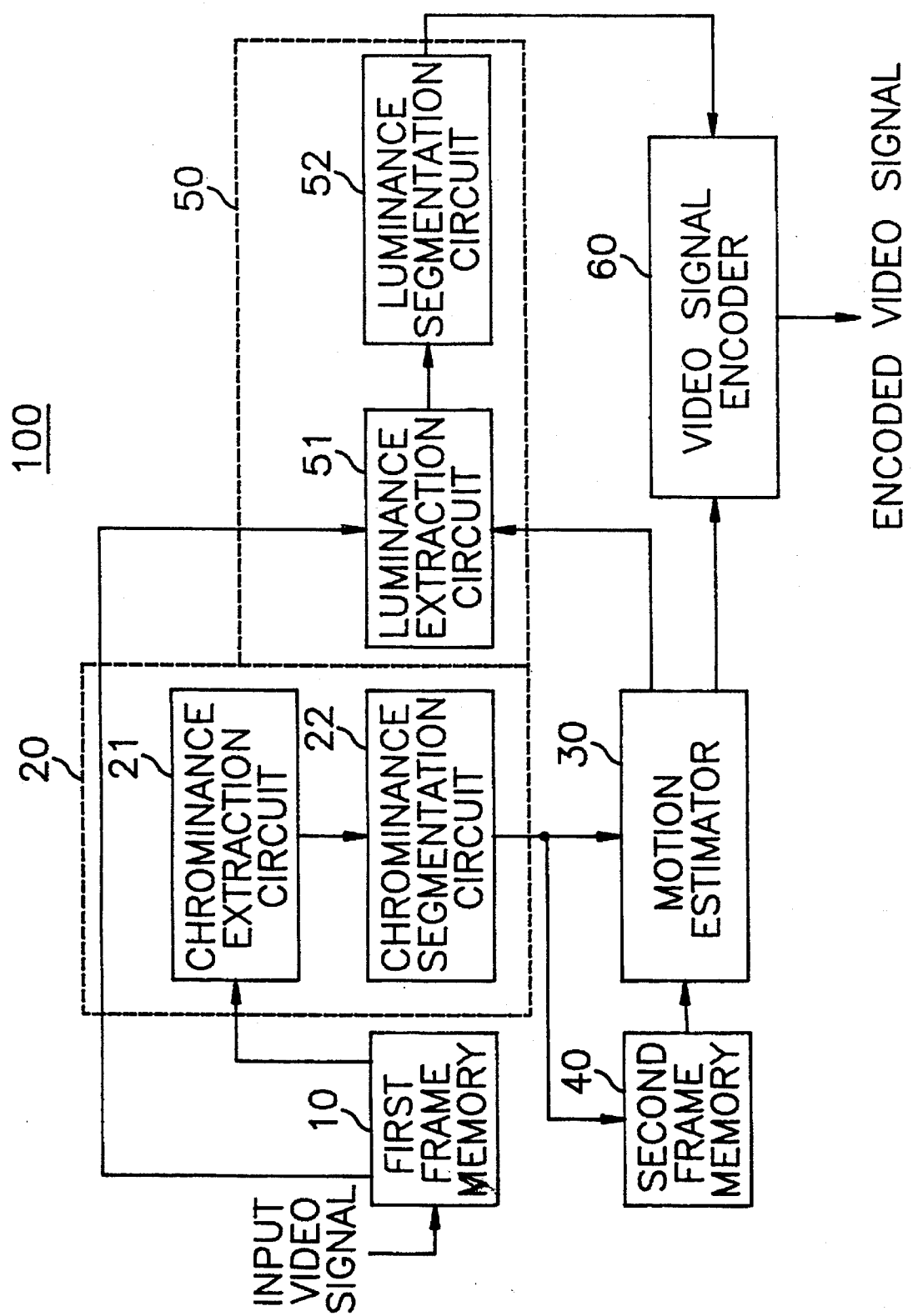

APPARATUS FOR ENCODING A VIDEO SIGNAL EMPLOYING A HIERARCHICAL IMAGE SEGMENTATION TECHNIQUE

FIELD OF THE INVENTION

The present invention relates to an apparatus for encoding a video signal; and, more particularly, to an improved apparatus for encoding a video signal employing a hierarchical image segmentation technique, thereby improving the picture quality thereof.

BACKGROUND OF THE INVENTION

In a digital video system such as video-telephone, teleconference or high definition television system, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is inevitable to compress or reduce the volume of data through the use of various data compression techniques, especially, in the case of such low bit-rate video codec (coding-decoding) systems as video-telephone and teleconference systems.

One of such methods for encoding video signals for a low bit-rate encoding system is the so-called segmentation-based encoding technique.

In the segmentation-based encoding technique, an input video signal of a current image frame is first converted into a plurality of segmented regions based on the luminance levels of pixels included in the current image frame. One of the most widely used image segmentation techniques is a K-means algorithm, wherein each of the pixels is mapped into one of a predetermined number of representative luminance levels which yields a minimum error therebetween, thereby providing a segmented current image including a plurality of segmented current regions, each of which having one of the representative luminance levels.

Thereafter, a mean value of the original luminance levels of pixels included in each of the segmented current regions is calculated. Each of the predetermined representative luminance levels mapped on each of the segmented current regions is then updated with its corresponding calculated mean value, to thereby provide updated mean values. Such mapping and updating processes are sequentially repeated with respect to the original input image until a difference between each of the newly updated mean values and its previous updated mean value is smaller than a predetermined threshold value.

After the image segmentation, each of the segmented current regions of the segmented current image is motion estimated with respect to segmented previous regions included in its previous segmented image. That is, differences between a finally updated mean value of each segmented current region and that of each of the segmented previous regions are calculated first to select one of the segmented previous regions which yields a minimum difference. Thereafter, motion information for each segmented current region is determined, wherein the motion information represents the selected segmented previous region.

Finally, the determined motion information for each segmented current region together with contour and difference information thereof are encoded. There are two types of information constituting the contour information: shape and location. The shape information refers to the form of each contour, whereas the location information deals with the position of each contour within the image. And as the difference information, a difference value between a finally updated mean value of each segmented current region and that of the selected segmented previous region is encoded.

Since, however, in the conventional segmentation-based encoding technique, fluctuation ranges of the luminance levels employed to derive the segmented current regions are generally larger than those of the chrominance levels between the current and its previous images, the determined motion information for each segmented current region may be imprecise, which may, in turn, degrade the picture quality of the encoded video signal.

SUMMARY OF THE INVENTION

It is, therefore, a primary object of the present invention to provide an apparatus for encoding a video signal employing an improved image segmentation technique which hierarchically segments the chrominance and luminance levels of pixels contained in the video signal, thereby improving the picture quality thereof.

In accordance with the invention, there is provided an improved apparatus for encoding an input video signal, wherein the input video signal includes a sequence of image frames, each of the image frames having a predetermined number of pixels and each of the pixels being represented by a luminance level and a chrominance level, the apparatus comprising a chrominance extraction circuit for extracting chrominance levels for pixels contained in a current image frame of the input video signal to generate a current chrominance image; a chrominance segmentation circuit for deriving a plurality of segmented current chrominance regions by using the generated current chrominance image to produce contour and texture information of each segmented current chrominance region, wherein the contour information represents the shape and location of said each segmented current chrominance region and the texture information represents a mean chrominance level of all pixels contained in said each segmented current chrominance region; a memory for storing and delaying the contour and texture information for the plurality of segmented current chrominance regions to provide the delayed information as contour and texture information for segmented previous chrominance regions; a motion estimator for calculating differences between texture information of each segmented current chrominance region and that of each of the segmented previous chrominance regions to select one of the segmented previous chrominance regions which yields a minimum difference, and for generating search region information representing positions of all pixels contained in said each segmented current chrominance region, motion information denoting the selected segmented previous chrominance region and difference information representing a difference between the texture information of said each segmented current chrominance region and that of the selected segmented previous chrominance region; a luminance extraction and segmentation circuit, in response to the search region information, for extracting its corresponding segmented luminance region having luminance levels from the current image frame and for deriving a multiplicity of sub-segmented luminance regions by using the luminance levels included in the segmented luminance region to provide contour and texture information of each sub-segmented luminance region, wherein the contour information represents the shape and location of said each sub-segmented luminance region and the texture information represents a mean luminance level of all pixels in said each sub-segmented luminance region; and an encoder for encoding the contour and texture information, the motion information, the difference information for each segmented current chrominance region, and the contour and texture information for each sub-segmented luminance region to provide an encoded video signal.

BRIEF DESCRIPTION OF THE DRAWING

The above and other objects and features of the present invention will become apparent from the following description of preferred embodiments given in conjunction with the accompanying drawing, which is a block diagram of the invention illustrating a novel apparatus for encoding a video signal employing a hierarchical image segmentation technique.

DETAILED DESCRIPTION OF THE PREFERRED EMBODIMENTS

Referring to the drawing, there is provided a block diagram of a novel apparatus for encoding a video signal employing a hierarchical image segmentation technique in accordance with the present invention. The inventive video signal encoding apparatus 100 comprises a first and a second frame memories 10 and 40, a first and a second image segmentation processors 20 and 50, a motion estimator 30 and a video signal encoder 60.

As shown in the drawing, an input video signal including a sequence of image frames is applied, on a frame-by-frame basis, to the first frame memory 10 for the storage thereof. Each of the image frames includes M×N pixels, wherein each of the M×N pixels is represented by a luminance level (L) and a chrominance level (C), and M are N are positive integers. As is well known in the art, the luminance level (L) represents a brightness of a pixel, whereas the chrominance level (C) carries color information of the pixel represented by two chrominances, Cr and Cb.

Chrominance data of a current image frame is extracted first by a chrominance extraction circuit 21 of the first image segmentation processor 20 from the first frame memory 10 to generate a current chrominance image, wherein the chrominance data represents chrominance levels of pixels included in the current image frame. The generated current chrominance image is then supplied to a chrominance segmentation circuit 22 of the first image segmentation processor 20.

At the chrominance segmentation circuit 22, the current chrominance image is converted into a plurality of segmented current chrominance regions by using one of the conventional image segmentation techniques well known in the art, e.g., a K-means algorithm, to produce segmentation data, i.e., contour and texture information for each segmented current chrominance region. The contour information represents the shape and location of each segmented current chrominance region and the texture information represents a finally updated mean chrominance level of all pixels contained in each segmented current chrominance region.

Specifically, each of the chrominance levels contained in the current chrominance image from the chrominance extraction circuit 21 is compared with a predetermined number of representative chrominance levels; and error values therebetween are calculated. It should be noted that the number of representative chrominance levels can be determined based on the required chrominance segmentation efficiency and picture quality of the video signal encoding apparatus. Thereafter, each of the chrominance levels is mapped or replaced by one of the representative chrominance levels which yields a minimum error value.

Once the mapping processes for the chrominance levels of all the pixels in the current chrominance image have been performed, the mapped representative chrominance levels are segmented into a plurality of regions, wherein each of the segmented regions includes pixels represented by one of the representative chrominance levels. Thereafter, a mean value for original chrominance levels of the pixels included in each of the segmented regions is calculated; and each of the representative chrominance levels mapped onto each segmented region is updated with its corresponding calculated mean value to thereby produce updated mean values.

Such mapping and updating processes are sequentially repeated with respect to the original chrominance levels of the pixels until a difference value between each of newly updated mean values and its previous updated mean value is smaller than a predetermined threshold value TH, wherein the threshold value TH is a positive integer.

When these mapping and updating processes have been completed, the chrominance segmentation circuit 22 generates and provides contour and texture information for each of a plurality of segmented current chrominance regions to the motion estimator 30 and the second frame memory 40, wherein the contour and texture information have the same meanings as mentioned above.

The second frame memory 40 serves to store and delay the contour and texture information for all the segmented current chrominance regions from the chrominance segmentation circuit 22 by one frame interval. The delayed contour and texture information is then provided from the second frame memory 40 to the motion estimator 30 as contour and texture information for a plurality of segmented previous chrominance regions.

At the motion estimator 30, in order to derive motion information for segmented current chrominance regions directly fed from the chrominance segmentation circuit 22, each of them is first aligned as a search region in sequence. And then, errors between texture information or a finally updated mean value of the search region and that of each of the segmented previous chrominance regions read out from the second frame memory 40 are calculated; and one of the segmented previous chrominance regions which yields a minimum error is selected.

Thereafter, the motion estimator 30 determines the selected segmented previous chrominance region as motion information for the search region. Outputs from the motion estimator 30 to the video signal encoder 60 are the motion information and the contour information of the search region, and difference information representing a difference between texture information of the search region and that of the selected segmented previous chrominance region. And, output from the motion estimator 30 to the second image segmentation processor 50 is search region information representing positions of the pixels contained in the search region.

As shown in the drawing, the second image segmentation processor 50 includes a luminance extraction circuit 51 and a luminance segmentation circuits 52. In response to the search region information from the motion estimator 30, the luminance extraction circuit 51 extracts its corresponding luminance data from the current image frame stored in the first frame memory 10 to provide a segmented luminance region corresponding to the search region, wherein the luminance data represents luminance levels of the pixels contained within the segmented luminance region. The segmented luminance region containing the luminance levels is then provided to the luminance segmentation circuit 52.

At the luminance segmentation circuit 52, the segmented luminance region is further segmented to derive a multiplicity of sub-segmented luminance regions by using, e.g., the K-means algorithm as described in the case of the chrominance segmentation circuit 22. There is utilized a multiplicity of representative luminance levels for the sub-segmentation of the segmented luminance region. It should be appreciated that the number of representative luminance levels can be determined based on the required luminance segmentation efficiency and picture quality of the video signal encoding apparatus. All pixels in each of the sub-segmented luminance regions are represented by a finally updated mean value derived based on the luminance levels of the pixels.

Outputs from the luminance segmentation circuit 52 to the video signal encoder 60 are the contour and texture information for each of the sub-segmented luminance regions, wherein the contour information represents the shape and location of each sub-segmented luminance region and the texture information represents the finally updated mean value of the pixels contained in each sub-segmented luminance region.

At the video signal encoder 60, the contour information, the motion information and the difference information for the search region from the motion estimator 30, and the contour and texture information for each of the sub-segmented luminance regions corresponding to the search region from the luminance segmentation circuit 52 are encoded. The encoded video signal is then provided to a transmitter (not shown) for the transmission thereof. As shown above, the present invention is capable of improving the picture quality of an encoded video signal by effectively performing the segmentation and motion estimation for an input video signal utilizing a hierarchical image segmentation method of the present invention.

While the present invention has been shown and described with respect to the particular embodiments, it will be apparent to those skilled in the art that many changes and modifications may be made without departing from the spirit and scope of the invention as defined in the appended claims.

What is claimed is:

1. An apparatus for encoding an input video signal, wherein the input video signal includes a sequence of image frames, each of the image frames having a predetermined number of pixels and each of the pixels being represented by a luminance level and a chrominance level, which comprises:

means for extracting chrominance levels for pixels contained in a current image frame of the input video signal to generate a current chrominance image;

segmentation means for deriving a plurality of segmented current chrominance regions by using the generated current chrominance image to produce contour and texture information of each segmented current chrominance region, wherein the contour information represents the shape and location of said each segmented current chrominance region and the texture information represents a mean chrominance level of all pixels contained in said each segmented current chrominance region;

means for storing and delaying the contour and texture information for the plurality of segmented current chrominance regions to provide the delayed information as contour and texture information for segmented previous chrominance regions;

means for calculating differences between texture information of each segmented current chrominance region and that of each of the segmented previous chrominance regions to select one of the segmented previous chrominance regions which yields a minimum difference, and for generating search region information representing positions of all pixels contained in said each segmented current chrominance region, motion information denoting the selected segmented previous chrominance region and difference information representing a difference between the texture information of said each segmented current chrominance region and that of the selected segmented previous chrominance region;

means, in response to the search region information, for extracting its corresponding segmented luminance region having luminance levels from the current image frame and for deriving a multiplicity of sub-segmented luminance regions by using the luminance levels included in the segmented luminance region to provide contour and texture information of each sub-segmented luminance region, wherein the contour information represents the shape and location of said each sub-segmented luminance region and the texture information represents a mean luminance level of all pixels in said each sub-segmented luminance region; and means for encoding the contour and texture information, the motion information, the difference information for each segmented current chrominance region, and the contour and texture information for each sub-segmented luminance region to provide an encoded video signal.

2. The apparatus as recited in claim 1, wherein said segmentation means for deriving the plurality of segmented current chrominance regions is operated based on a K-means algorithm.

* * * * *